United States Patent Office 3,592,693
Patented July 13, 1971

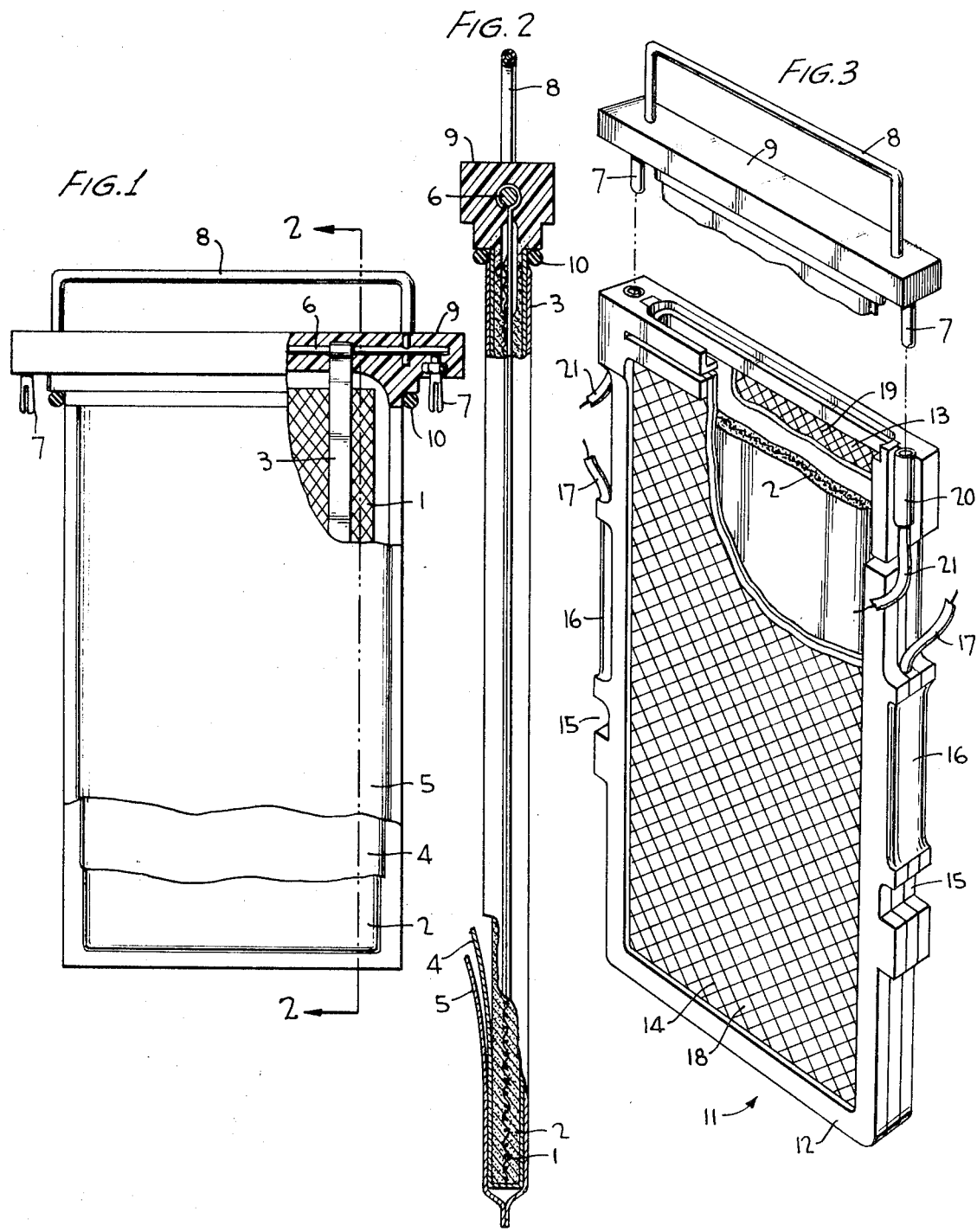

3,592,693
CONSUMABLE METAL ANODE WITH DRY ELECTROLYTIC ENCLOSED IN ENVELOPE
Martin G. Rosansky, Forest Hills, N.Y., assignor to Leesona Corporation, Warwick, R.I.
Filed Feb. 2, 1968, Ser. No. 702,658
Int. Cl. H01m 1/02, 29/04
U.S. Cl. 136—86
8 Claims

ABSTRACT OF THE DISCLOSURE

A consumable metal electrode for an electro-chemical cell containing an alkaline metal hydroxide electrolyte in dry form is described. Accordingly, a cell employing the electrode can be activated by the addition of water to the cell forming a conductive aqueous electrolyte solution.

This application is an improvement on the subject matter of commonly-assigned application Ser. No. 614,684 filed Feb. 8, 1967.

FIELD OF INVENTION AND PRIOR ART

This invention is directed to improved electro-chemical cells for generating electrical energy. More particularly, the invention is directed to an electro-chemical cell comprising an electrode in which sufficient water soluble electrolyte in dry form is maintained in at least one of the electrodes to permit activation of the electrolyte by the addition of water.

It is recognized that electrochemical cells are subject to severe limitations in certain applications as a result of the need to have the electrolyte which is essential in the operation of the cell present in the cell from the time the cell is assembled until its ultimate use. Accordingly, batteries of cells have been constructed which are "dry" during storage with the total electrolyte added at the time the battery of cells is put into operation.

Alhough the advantages of such systems are obvious, such as always having fresh electrolyte and electrode elements and ancillary parts free from contact with the electrolyte, disadvantages are inherent. A major disadvantage is the need for an inexperienced operator to handle a corrosive an at least potentially dangerous substance, i.e. the electrolyte. Unfortunately, most substances which will transport ions from electrode to electrode of an electrochemical cell at a rate sufficient to generate a practical current are either strong acids, strong bases, or some other corrosive material.

With the advent of the more advanced technology in metal/air cells and more particularly metal/air cells which utilize replaceable consumable metal anodes in conjunction with a non-consumable cathode, permitting mechanical recharging of the cells by removing expended anodes and inserting fresh anodes, the need to eliminate the handling of corrosive electrolytes has become even more imperative.

OBJECTS AND GENERAL DESCRIPTION OF INVENTION

Accordingly, it is an object of the present invention to provide an electrochemical cell which can be "activated" by the mere addition of water.

It is another object of the present invention to provide an electrode for use in an electrochemical cell comprising sufficient water soluble electrolyte therein to permit the "activation" of the cell by the addition of water.

It is another object of this invention to provide an improved metal/air cell comprising a non-consumable cathode and a consumable metal anode which can be "charged" by inserting a consumable anode containing in dry form sufficient water soluble electrolyte to operate the battery and adding water to the cell to obtain an active cell.

These and other objects of the invention will be more readily apparent from the following detailed description, with particular emphasis being placed on the example and drawing.

The aforesaid objects of the present invention are accomplished by impregnating a metal anode with an aqueous alkaline hydroxide electrolyte and thereafter drying the anode by driving off the water leaving the "dry" electrolyte within the anode. The anode, to ensure that sufficient electrolyte is retained therein, must be relatively porous. Normally, the electrode will have a total porosity of from about 15–90 percent. However, it is preferred that the porosity be within the range of 50–80 percent. Moreover, electrodes which are retained in or wrapped in a hydrophilic separator paper have been found to be the most satisfactory.

The porous metal electrodes useful in carrying out the present invention can be fabricated using conventional procedures. For example, select metal powders or particles can be compressed in a conventional manner under suitable conditions of elevated temperature and pressure to form an anode having the desired shape. The temperature and pressure employed are not particularly critical provided complete sinteing an coalescence of the particles does not occur. Temperatures at approximately the sintering temperature of the metal at the pressure employed are preferred. Altenatively, the metal particles can be admixed with a powdered resinous binder such as polyvinylalcohol. The admixture of metal particles and binder is compressed in a conventional manner, again under suitable conditions of elevated temperature and pressure to form an electrode having the desired shape and porosity. The temperature depends upon the resin selected and the pressure applied which is normally at from about 250 to 25,000 p.s.i. As a further alternative procedure, metal oxides can be placed in a suitable mold and the oxides reduced to the active metal and thereafter compressed to the desired thickness and shape. After the metal body is formed, although not completely necessary, preferably it is wrapped in a hydrophilic material which will help retain the aqueous electrolyte and improve the mechanical integrity and performance of the electrode. Such electrodes can be rapidly discharged and recharged without detrimental change in shape or the like. This latter feature is of critical importance in metal/air cells where the cells are mechanically recharged by removing the discharged anodes and inserting fresh anodes. When using replaceable anodes, the shape and integrity of the shape is an important feature.

The metal powder used in making the anode described herein can be any conventional electro-conductor employed as the electrode material in an electrochemical cell. In the preferred embodiment where the improved electrode is employed as the anode in a metal/air cell, it is essential that the electrode material selected be electrochemically reactive with a compatible electrolyte and be more electro-positive than oxygen. Such materials include lead, zinc, iron, cadmium, aluminum, and magnesium. From the standpoint of cost, capacity, and convenience, zinc is a preferred material. The particle size of the metal is not critical. Preferably, however, the metal selected will have a particle size of from about 0.5 to 40 mils in diameter. In the event a plastic binder is used, it should have a particle size of about the same magnitude as the metal patricles or smaller. Normally, the binder which includes such materials as polytetrafluoroethylene, polyethylene, polyvinylchloride, polyvinylalcohol, polypropylene, co-polymers of vinyl chloride and acrylonitrile, ethylacetate and the like will comprise from about 0.5 to 18 percent by weight of the total mixture. In the event the electrode is to be wrapped or retained in a hydrophilic sheet, materials such as fibrous synthetic material such as a co-polymer of vinyl chloride and acrylonitrile sold by the Union Carbide Corporation under the trademark "Dynel," polyamide polymers, co-polymers of polyvinyl-alcohol and polyvinylchloride, polyacrylate esters and the like can be selected. The thickness of the wrap is not particularly critical, but should be as thin as possible in order to improve the energy to density ratio of the total cell as well as to minimize the internal resistance of the cells. The membranes preferably are from about 0.5 to 10 mils in thickness.

The electrolyte which is to be retained in the electrode in dry form must be compatible with the metal of the electrode and soluble in water. Preferred electrolytes are the alkali metal hydroxides such as lithium hydroxide, sodium hydroxide, potassium hydroxide, rubidium hydroxide, and cesium hydroxide. The electrolyte is introduced into the anode as an aqueous solution of the alkali metal hydroxide, preferably at a fairly high concentration, i.e., from about 28–45 percent of the alkali hydroxide. Once the electrode is completely impregnated, the electrode is dried in a suitable convection oven or the like to drive off the water without removing the alkali metal hydroxide. The alkali metal hydroxide is retained within the electrode pores and the hydrophilic wrap, if one is employed, in dry form. Such structures are completely stable and can be handled without excessive care permitting the bagging of the anode in a suitable plastic such as polyethylene, polypropylene, polyvinylchloride, and polymethylmethacrylate or laminates of aluminum or other lightweight metals and a plastic such as polyethylene, polyvinylchloride or the like. When the electrode is to be incorporated in a cell, either in the assembly of a complete battery of cells or in a mechanically rechargeable metal/air battery, the bag can be torn open, the anode inserted, and the cell activated at that time or at a later time by the mere addition of water. After the water is added, it only takes a minimum of time for the alkali metal hydroxide to be redissolved in the added water to provide an active electrolyte. As apparent, the aforesaid procedure substantially minimizes the handling of a wet, corrosive electrolyte by an inexperienced operator. In other words, at the time the anodes are incorporated in the cell containing the dry electrolyte, their corrosive nature is minimized. The liquid which is pure water will not cause detrimental affects if it is accidentally spilled or if the battery overflows. The advantages of the presently described electrodes are apparent.

THE DRAWING AND SPECIFIC DESCRIPTION

Having described the invention in general terms, a more detailed explanation will be set forth with reference to the drawing and the detailed example. In the drawing, FIG. 1 is a front view partially in section of an electrode, FIG. 2 is a partial cross-sectional view along line 2—2 of FIG. 1, and FIG. 3 is a partially exploded view of an air depolarized cell utilizing an electrode as shown in FIGS. 1 and 2.

Referring primarily to FIGS. 1 and 2, a metal grid current collector 1 which conveniently is a metal screen is utilized as the center or support for a metal body 2. Current collector tabs 3, which preferably are silver strips approximately ⅛ by .010 inch thick are placed on the metal screen so that they extend beyond the metal screen. The metal body is made by mixing zinc oxide and mercury oxide at a weight ratio of 98 percent zinc to 2 percent mercury based on the metal. A separator material such as a co-polymer of vinyl chloride and acrylonitrile is placed in a mold. The admixture of zinc oxide and mercury oxide is placed on the separator material in the mold and leveled to approximately one-half the thickness of the desired electrode. A conductive silver screen 1 and silver current collecting tabs 3 are placed over the mixture and, thereafter, the remainder of the admixture of zinc oxide and mercury oxide added. The metal oxide powders are lightly compacted and the separator paper sealed. The structure is placed in a tank of 5 percent aqueous potassium hydroxide and electrolytically reduced at a current density of 0.19 amp per square inch over a period of approximately 8 hours. After the reduction, the electrode is washed to remove excess potassium hydroxide and the structure pressed to the thickness desired and dried to give a porous structure. Thereafter, a layer of de-sulfurized fibrous cellulose 4 0.003 inch in thickness was wrapped around the porous body. A bag 5 composed of a co-polymer of vinyl chloride and acrylonitrile having a membrane thickness of 0.004 inch was employed to enclose the wrapped porous metal body. The zinc body which weighed approximately 45 grams had a porosity of 77 percent. The silver current collector tabs 3 which are on either end of the electrode were placed in contact with a bus bar 6 which was in contact with plugs 7. A handle 8 was attached to the bus bar. Thereafter, a plastic electrode top 9 was encapsulated over the bus bar around the base of terminal 7, sealing the bus bar 6, handle 8 and the top part of bag 5 in position. An O-ring composed of buna-N rubber 10 circumscribes an indentation in the plastic electrode top. The base of the electrode is 2.5 inches wide and .12 inch thick. The top of the electrode, i.e., the plastic electrode top, is 3.2 inches wide and 0.32 inch thick. The electrode, comprising the porous zinc body and the wrapping materials which weigh approximately 15 grams, is thereafter carefully impregnated with 11 grams of a 35 percent aqueous solution of potassium hydroxide. After impregnation, the electrode is placed in a convection oven maintained at 130° C. for a period of 35 minutes to drive off the water in the electrolyte to provide an electrode uniformly, or substantially uniformly, impregnated with "dry" electrolyte. The electrode can be inserted directly into an electrochemical cell, and the cell activated at the desired time by the mere addition of water, or the electrode can be bagged in a plastic container, or the like, and stored dry until it is to be used in a metal/air cell.

FIG. 3 illustrates a metal/air cell utilizing an anode of the type shown in FIGS. 1 and 2. The cell module comprises an envelope catalyst 11 made up of a bi-cell frame 12 and reactive cathodes 13 and 14. The frame shown contains cell guide supports 15 which are to facilitate the positioning of the cell module in a battery casing and moldings 16 which house positive leads 17 which are in electrical contact with the cathode. In the embodiment shown, the cathode is made up of a continuous hydrophobic membrane 18, a conductive support screen 19, and an electrocatalyst layer pressed into and around the support screen. The hydrophobic membrane is polytetrafluoroethylene and the electrocatalyst is a uniform admixture of platinum and polytetrafluoroethylene particles. The catalyst and bonding agent are present at a weight ratio of 10 parts to 3 parts. The anode fits into the envelope cathode and is locked into position by negative terminals 7 which fit into negative terminal jacks 20 of the envelope cathode. The terminals are in electrical contact with the anode body by silver current collecting tab 3 as noted hereinbefore. The handle 8 is employed to facilitate removal of the anode. Negative leads 21 emerge from the jack terminal at each side of the cell. Since the electrolyte of the cell is retained in the pores and in the wrappings of the anode, the cell can be activated at the desired time of use by merely raising the anode from the envelope cathode, adding water to the space in the cathode. The "dry" electrolyte will be dissolved by the water and the cell capable of operation within seconds. A plurality of the aforesaid cells, when in series or parallel connection, can be utilized as the power source for various units including radio receiving and transmitting sets or the like.

In the aforesaid embodiment, the zinc oxide and mercury oxide particles can be replaced by other metal oxide particles which are compatible with the electrolyte of the cell and which are more electropositive than oxygen. Thus, the zinc oxide powder can be replaced with oxides of lead, iron, cadmium, aluminum, and magnesium powders. Furthermore, the metal particles themselves, or the metal particles in admixture with a resinous binder, can be employed. Additionally, the unglycerinated desulfurized fibrous cellulose membrane can be replaced with other cellulosic membranes, and the second wrapping can be replaced with fibrous polyamide membranes, co-polymers of vinylchloride and polyvinylalcohol, and the like. Furthermore, although the above example refers to a metal/air cell, it is possible to utilize the eelctrodes containing the "dry" electrolyte with advantage in cells other than metal/air cells, such as the silver-zinc galvanic cells. It should be appreciated that the instant invention is not to be construed as being limited by the illustrative embodiment. It is possible to produce still other embodiments without departing from the inventive concept herein disclosed. Such embodiments are within the ability of one skilled in the art.

It is claimed:

1. In an assembly including select elements for use with metal/air depolarized cells, said cells comprising as essential elements an air depolarized cathode, a consumable metal anode, a hydrophilic separator, and a material capable of functioning as an electrolyte in aqueous solution, said assembly including from said essential elements only said anode, said hydrophilic separator, and said material, said hydrophilic separator disposed around and in contact with said anode, at least one of said separator and anode including a quantity of said material capable of functioning as an electrolyte in aqueous solution, said quantity of said material in said separator and anode constituting the sole source of electrolyte material and being sufficient to operate the cell substantially over the life of said anode when disposed therein without requiring additional electrolyte material or any other material with the exception of water, and a substantially liquid and substantially gas impermeable envelope enclosing said assembly, the improvement wherein said material capable of functioning as an electrolyte in aqueous solution is in a dry state.

2. The article of claim 1 wherein said dry electrolyte material is an alkali metal hydroxide.

3. The article of claim 2 wherein said dry electrolyte material is potassium hydroxide.

4. The article of claim 1 wherein said anode body has a porosity of from about 15 percent to 90 percent.

5. The article of claim 4 wherein said dry potassium hydroxide comprises about 9 percent of the weight of said anode body.

6. The article of claim 4 wherein the metal of the consumable metal anode is zinc.

7. The article of claim 4 wherein said anode body includes from 0.5 to 18 percent of a binder.

8. The article of claim 7 wherein said binder is selected from the group consisting of polytetrafluoroethylene, polyethylene, polyvinylchloride, polyvinylalcohol, polypropylene, and co-polymers of vinylchloride and acrylonitrile.

References Cited

UNITED STATES PATENTS

| 3,226,260 | 12/1965 | Drengler | 136—30 |
| 3,293,080 | 12/1966 | Gruber et al. | 136—86 |
| 3,335,031 | 8/1967 | Kordesch | 136—30X |
| 3,355,326 | 11/1967 | Semones et al. | 136—86 |
| 3,368,924 | 2/1968 | Benderly et al. | 136—30X |
| 3,436,270 | 4/1969 | Oswin et al. | 136—86 |

FOREIGN PATENTS

| 813,408 | 5/1959 | Great Britain | 136—30 |

ALLEN B. CURTIS, Primary Examiner

U.S. Cl. X.R.

136—30, 132, 153